United States Patent [19]

Morse et al.

[11] 3,743,059
[45] July 3, 1973

[54] MECHANICAL ISOLATOR AND DAMPER

[75] Inventors: Robert E. Morse, Palos Verdes Estates; Anthony A. Rizzo, Torrance, both of Calif.

[73] Assignee: TRW Inc., Redondo Beach, Calif.

[22] Filed: Nov. 15, 1971

[21] Appl. No.: 198,638

[52] U.S. Cl.................. 188/1 B, 248/21, 267/152, 308/184
[51] Int. Cl................................................ F16f 7/00
[58] Field of Search.................... 188/1 B, 1 C, 129, 188/130; 248/21, 358 R; 267/137, 152; 308/184

[56] References Cited
UNITED STATES PATENTS

| | | | |
|---|---|---|---|
| 2,614,896 | 10/1952 | Pierce | 188/1 B X |
| 3,031,034 | 4/1962 | Thomas | 188/1 B |
| 3,653,625 | 4/1972 | Plice | 248/358 R |

*Primary Examiner*—Duane A. Reger
*Attorney*—Daniel T. Anderson et al.

[57] ABSTRACT

A mechanical isolator and damper has been developed which can be adapted to isolate shocks and damp vibrations to ball bearings, flexural pivots, and other similar rotating and oscillating devices. It can also be used as a bushing for shafts where isolating and damping is required. The damper comprises concentric outer and inner tubular collars connected by leaf springs, the space between the two collars being filled with a shock absorbing substance, such as an elastomeric material. Vibration damping and shock absorption is provided for fixed or moving devices positioned within the inner collar.

6 Claims, 5 Drawing Figures

PATENTED JUL 3 1973   3,743,059

Anthony A. Rizzo
Robert E. Morse
INVENTORS

BY

AGENT

MECHANICAL ISOLATOR AND DAMPER

BACKGROUND OF THE INVENTION

This invention relates to a new and improved mechanical vibration isolator and damper, and more specifically to a mechanical isolator and damper adapted to provide control over natural frequency, and to shock and vibration absorption for a fixed or moving device associated with the damper such as a shaft, ball bearing race, flexural pivot, etc.

A typical use of such a damper would be for the flexural supports of an oscillating mirror in a spacecraft application where the position of the oscillating shaft assembly must maintain precisely both radial and axial location and alignment. Also, the flexural supports must be protected against shock and vibration during launch and boost of the satellite.

In the case of a rotating shaft in a bushing where protection against shock and vibration is necessary, it would be desirable to use a device which can substitute the functions of a bushing and provide vibration and shock damping to the shaft, and to control the natural frequency of response.

It is, therefore, an object of this invention to provide a mechanical isolator and damper for a device which is fixed, or which rotates, oscillates, or reciprocates therein.

Another object is to provide a mechanical isolator and damper for a fixed, oscillating or rotating device, the damper being adapted to provide vibration and shock protection to the device.

Other objects of the invention will become apparent from the description and drawings to follow.

Figure 1:
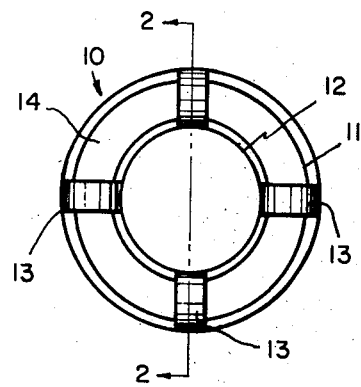
FIG. 1 is an end elevation view of the damper.
Figure 2:
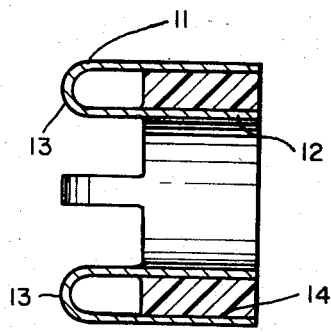
FIG. 2 is a side elevation in axial section along the line 2—2 of FIG. 1.

The mechanical damper 10 of this invention is shown in FIGS. 1 and 2, and comprises inner and outer tubular members 11 and 12 respectively joined at one end by a plurality of integrally machined leaf members 13 which function as springs. The damper may be formed using drawing dies (where sheet metal is employed), by an electrical discharge machine followed by milling operations, and by injection molding. It can also be fabricated using conventional lathes and milling machines.

A suitable alloy for the damper may be beryllium-copper or any other rigid forming material. Filled in the space between the outer and inner tubular members 11 and 12 is a resilient material 14 such as polyurethane, rubbers, etc. The springs 13 function to impart axial and radial rigidity to the holder while the resilient material 14 imparts lateral vibration damping and shock resistance from the outer to the inner member. The rigidity imparted by the springs 13 can be changed by varying the width, thickness, length, number, and material of construction; this will vary the resonant frequency of the damper 10. Changing the stiffness of the elastomer will vary the vibration damping of the damper.

Figure 3:
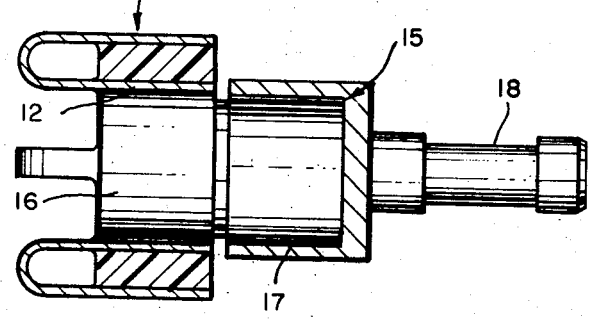
FIG. 3 is a side elevation view in axial section showing the damper and a flexural pivot mounted therein.

In FIG. 3, an assembly of the damper 10 with a flexural pivot 15 mounted therein is shown. One end 16 of the pivot may be bonded, press fitted, or otherwise mounted within the inner coller 12 of the mechanical damper. The moving portion 17 of the pivot shown adjacent the arrows is adapted to oscillate for a very large number of cycles, such as is required in spacecraft application. A shaft 18 is mounted axially on the pivot, and a mirror (not shown) is supported on the shaft and forms part of a sensor system in a spacecraft.

Figure 4:
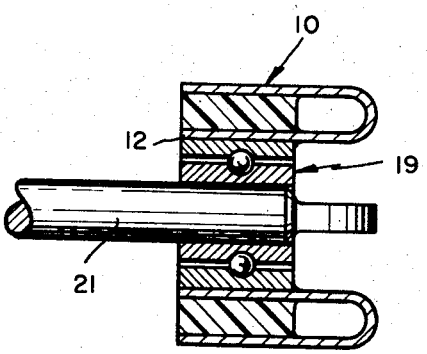
FIG. 4 is a side elevation in partial axial section showing a ball bearing race mounted within the damper.

In FIG. 4, an assembly of the mechanical damper 10 with a ball bearing race 19 is shown which supports a shaft 21. In many types of operation, vibration or shock is transmitted to the ball bearing race through the shaft 21, and it is desirable to at least partially isolate the bearing race (and hence the ball bearings) from these external forces to reduce damage to the bearings. The shaft 21 may either rotate as shown or it may be designed to reciprocate, as in FIG. 5.

Figure 5:
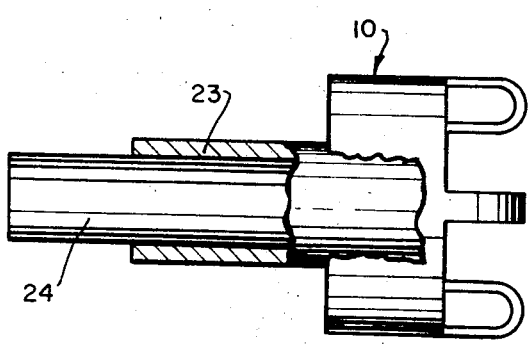
FIG. 5 is an axial view of a mechanical damper of the invention and a shaft mounted rotatably therein.

FIG. 5 shows the mechanical damper 10 and a bushing 23 mounted by the damper. A shaft 24 is rotatable within bushing 23 and the same degree of vibration and shock protection is afforded as with the ball bearings. Alternately, the damper may function as a bushing alone.

Graphs on a log log scale were plotted showing the dynamic response (G, peak) of the damper (polyurethane elastomer fill) to vibration along its radial axis when imparted to the lateral axis of a mirror supported by a flexural pivot which in turn is mounted by the damper. A similar graph was plotted showing the dynamic response when the damper is not used.

Similar graphs were plotted showing the dynamic response along the vertical axis of the mirror when employing the damper, and also the response without the damper.

In both cases, the Q factor (i.e., the ratio of applied to transmitted vibration) was reduced from about 15 to 5 or less.

Consequently, use of the damper permits reduction in dynamic response of the mass supported by flexural pivots and also enables control of the frequency at which major resonance occurs without adversely affecting the operational performance characteristics of the flexure supports.

Furthermore, a precision radial and axial location of a fixed shaft or rotating shaft is easily attainable.

Finally, the dimensions of the damper can be widely varied to permit mechanical isolation and damping at specific frequencies; also, the proportions of the damper may be varied to accommodate any size of device which it may support.

We claim:

1. A mechanical isolator and damper comprising:
    inner and outer stationary open-ended tubular members, said members defining a cylindrical annular space therebetween and a central tubular space within the said inner member;
    a plurality of integrally formed leaf members joining the said tubular members;
    a solid, stationary resilient material filled in the said cylindrical space;
    the leaf members adapted to impart axial and radial rigidity and a controlled natural frequency to the damper; and the resilient material adapted to impart lateral vibration damping and shock resistance from the outer to the inner member.

2. The mechanical damper of claim 1 in which the resilient material is a polyurethane.

3. A mechanical damper assembly comprising:

inner and outer stationary, open-ended, tubular members, said members defining a cylindrical annular space and a central tubular space within the said inner member;

a plurality of integrally formed leaf members joining the said tubular members;

a solid, stationary resilient material filled in the said cylindrical space;

the leaf members adapted to impart axial and radial rigidity to the damper;

The resilient material adapted to impart lateral vibration damping and shock resistance from the outer to the inner member; and a ball bearing race rotatably supported by the inner tubular member within the central tubular space.

4. A mechanical damper assembly comprising:

inner and outer stationary, open-ended, tubular members, said members defining a cylindrical annular space therebetween and a central tubular space within the said inner member;

a plurality of integrally formed leaf members joining the said tubular members;

a solid, stationary resilient material filled in the said cylindrical space;

the leaf members adapted to impart axial and radial rigidity to the damper;

the resilient material adapted to impart lateral vibration damping and shock resistance from the outer to the inner member; and a flexural pivot mounted in the inner tubular member within the central tubular space.

5. A mechanical damper assembly comprising:

inner and outer stationary, open-ended, tubular members, said members defining a cylindrical annular space therebetween and a central tubular space within the said inner member;

a plurality of integrally formed leaf members joining the said tubular members;

a solid, stationary resilient material filled in the said cylindrical space;

the leaf members adapted to impart axial and radial rigidity to the damper;

the resilient material adapted to impart lateral vibration damping and shock resistance from the outer to the inner member; and a bushing rotatably mounted in the inner tubular member within the central tubular space.

6. A mechanical damper assembly comprising:

inner and outer stationary, open-ended, tubular members, said members defining a cylindrical annular space therebetween and a central tubular space within the said inner member;

a plurality of integrally formed leaf members joining the said tubular members;

a solid, stationary resilient material filled in the said cylindrical space;

the leaf members adapted to impart axial and radial rigidity to the damper;

the resilient material adapted to impart lateral vibration damping and shock resistance from the outer to the inner member; and a device mounted in the inner tubular member within the central tubular space, the said damper adapted to provide mechanical isolation for the said device.

* * * * *